Aug. 28, 1951
W. N. LUNDAHL
2,565,734
X-RAY THICKNESS GAUGE
Filed April 28, 1949
4 Sheets-Sheet 1
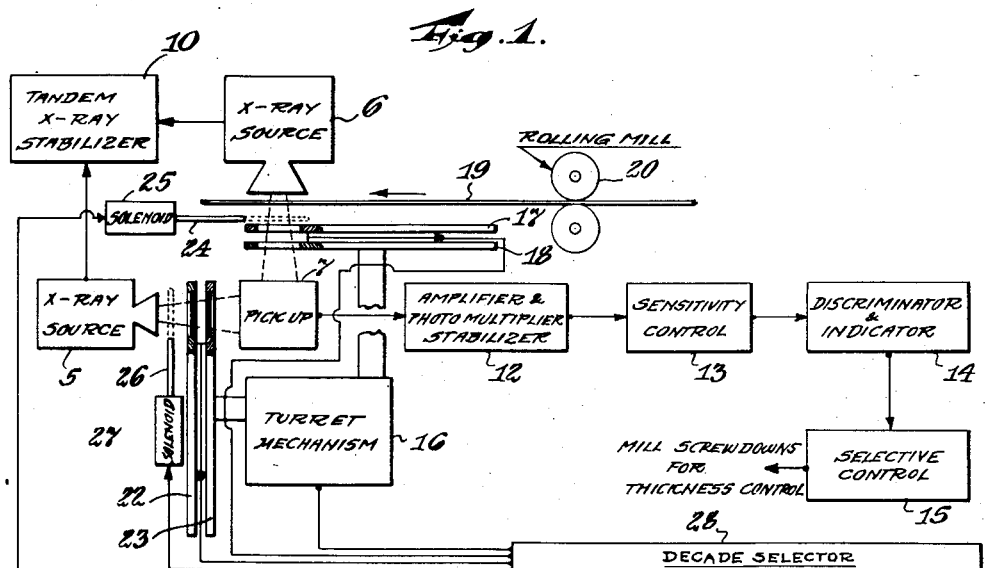
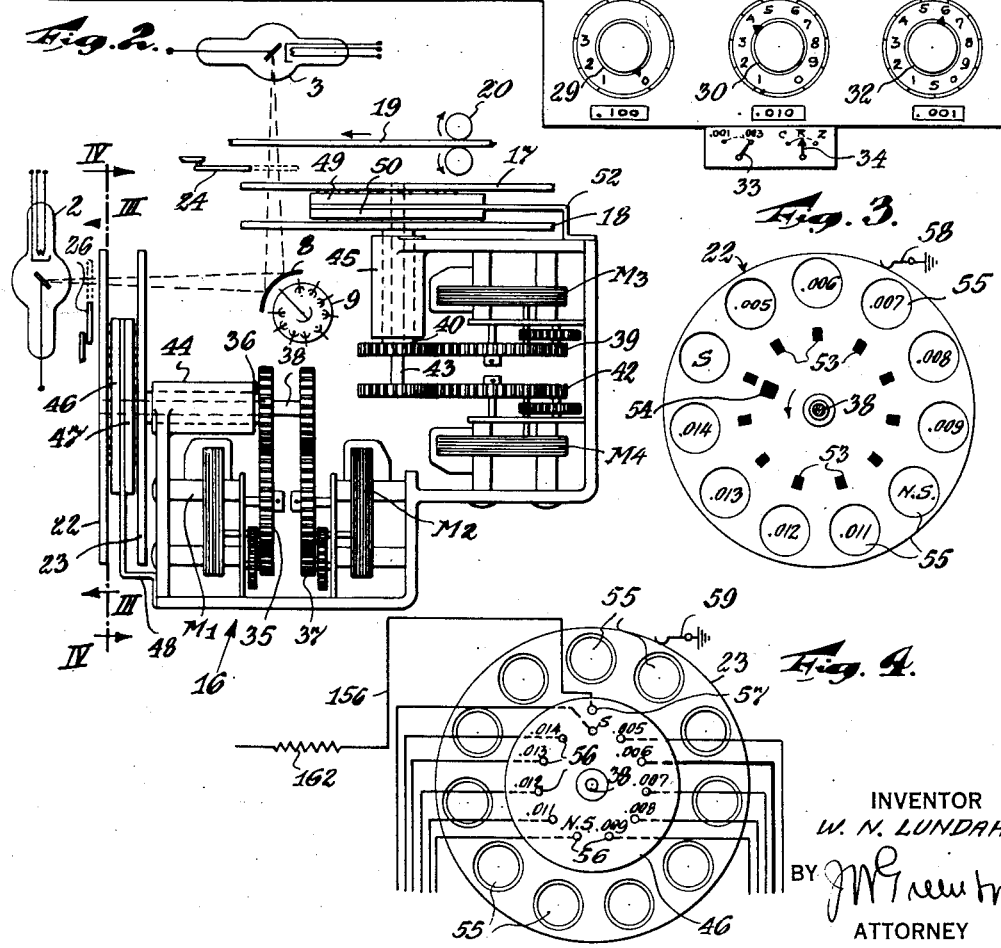
INVENTOR
W. N. LUNDAHL.
BY
ATTORNEY

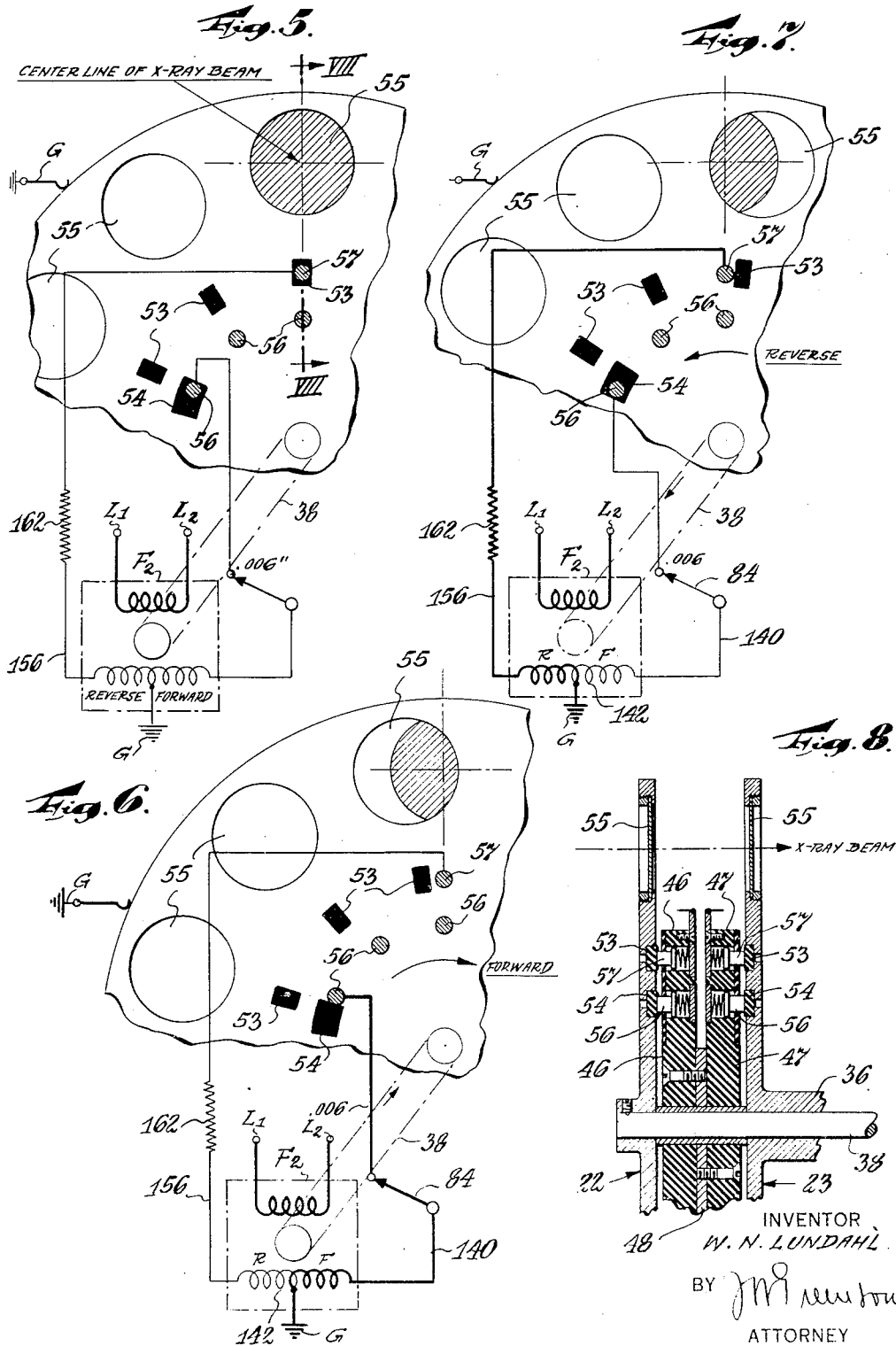

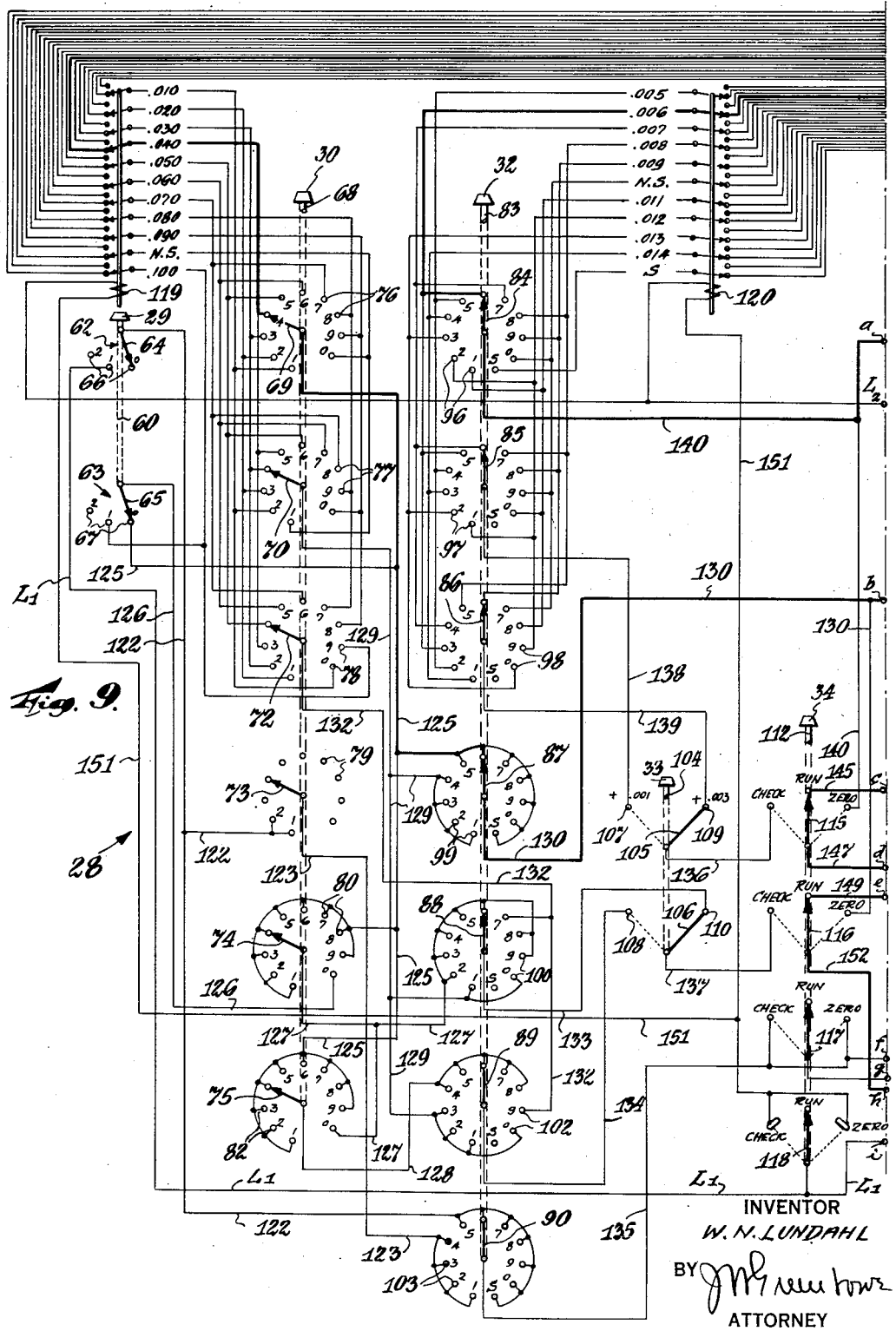

Aug. 28, 1951 W. N. LUNDAHL 2,565,734
X-RAY THICKNESS GAUGE
Filed April 28, 1949 4 Sheets-Sheet 4

INVENTOR
W. N. LUNDAHL
BY
ATTORNEY

Patented Aug. 28, 1951

2,565,734

UNITED STATES PATENT OFFICE 2,565,734

X-RAY THICKNESS GAUGE

Walter N. Lundahl, Pikesville, Md., assignor to Westinghouse Electric Corporation, East Pittsburgh, Pa., a corporation of Pennsylvania Application April 28, 1949, Serial No. 90,121

10 Claims. (Cl. 250—83.3)

The present invention relates to X-ray apparatus and more particularly to X-ray thickness gauges.

At the present time X-ray thicknes gauges are being used more and more extensively in industry to measure the thickness of sheet and strip material as it comes from the rolling mill. Such gauges make use of the long known phenomenon that the absorption of monochromatic X-rays by a homogeneous material varies, among other things, with the thickness of such material. Accordingly, the common practice is to measure the intensity of an X-ray beam passed through a material of preselected thickness and to compare such intensity with that of an X-ray beam passed through the same material which is being gauged. By the use of a null meter, a zero reading is obtained so long as the thickness of the gauged material is equal to that of the selected standard while any variation is immedately registeerd by a deflection of the meter from zero. Some X-ray thickness gauges employ but a single X-ray tube emitting a beam in two directions while the other and preferable system is to utilize two X-ray tubes but in either case, thickness variations of small magnitude, such as .001 inch, can be readily detected.

Heretofore, one of the disadvantages of one type of X-ray thickness gauge has been the necessity for changing standard thickness samples. This requires the operator to remove the standard thickness sample used in the previous run of material and insert the new standard thickness sample equal to the desired or "prime" thicknes of the new order of material to be run through the mill, shear or classifiers. After insertion of the new "fixed" standard sample in its position to be intercepted by the fixed standard X-ray beam, a "balance" sample of the same standard thickness must then be inserted to be intercepted by the other or "gauging" X-ray beam for the purpose of making a "balance check" which should thus give a zero reading on the meter. Following this "balance check," a standard "variable" sample, i. e., one of preselected thickness differential is then substituted for the "balance" sample, and the meter reading noted to determine if the system is functioning properly to accurately record this variation of the "variable" standard sample from that of the "fixed" standard sample.

These required tests consume considerable time on the part of the operator in inserting the various samples and walking to and from the control apparatus all of which is lost to time of operation of the high speed rolling mill.

It is accordingly the primary object of the present invention to provide an X-ray thickness gauge which is entirely automatic in its operation to calibrate and check for a desired gauge thickness.

Another object of the present invention is the provision of an X-ray thickness gauge which is rapidly set automatically in response to initiation by an operator for calibration and checking so as to record the precise thickness of material coming from a rolling mill.

Another object of the present invention is the provision of an X-ray thickness gauge wherein the operator may automatically set any desired "fixed" standard sample, make a "balance" check and a standard "variation" check, entirely from the control stand thus eliminating the necessity of approaching the X-ray generators or the rolling mill.

Still further objects of the present invention will become obvious to those skilled in the art by reference to the accompanying drawings, wherein:

Fig. 1 is a schematic illustration of an X-ray thickness gauge constructed in accordance with the present invention;

Fig. 2 is an elevational view of the turret mechanism portion of the X-ray thickness gauge as shown in Fig. 1 with other portions of the gauge being schematically shown;

Fig. 3 is a sectional view taken on the line III—III of Fig. 2, looking in the direction of the arrows;

Fig. 4 is a sectional view taken on the line IV—IV of Fig. 2, looking in the direction of the arrows;

Fig. 5 is an enlarged fragmentary view of the portions of the turret mechanism as illustrated in Fig. 3 and Fig. 4, together with a schematic showing of a portion of the electrical circuit for operating such portions;

Figs. 6 and 7 are identical to Fig. 5, except that they illustrate different superimposed positions of the two portions of the turret mechanism as shown in Figs. 3 and 4;

Fig. 8 is a cross-sectional view of the turret mechanism portion taken on the line VIII—VIII of Fig. 5;

Figure 10:
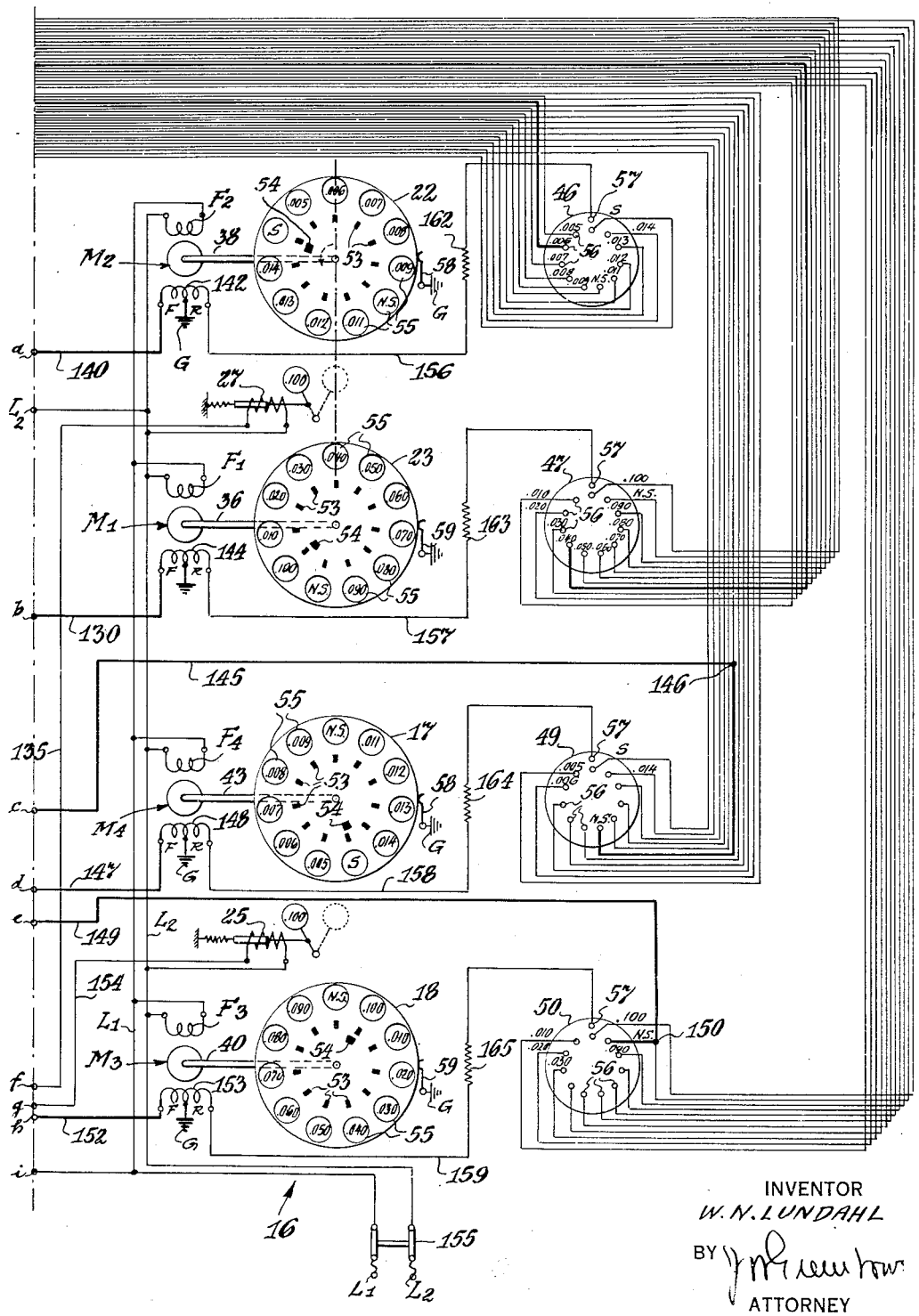

Fig. 9 is a diagrammatical illustration of the decade selector portion of the X-ray thickness gauge of the present invention as illustrated in Fig. 1, together with portions of the electrical control circuits; and Fig. 10 is a diagrammatical illustration of the electrical control circuits which together with the portion shown on Fig. 9, constitute the complete electrical control circuits for the decade selector.

Referring now to the drawings in detail, the embodiment of the X-ray thickness gauge of the present invention, as shown in Fig. 1, comprises a source of X-rays 5, such as an X-ray tube 2 (Fig. 2) housed within a shock-proof casing, and positioned to project an X-ray beam in a horizontal plane and a similar source of X-rays 6, positioned to project an X-ray beam from an X-ray tube 3 (Fig. 2) downwardly in a vertical plane which intersects the horizontal beam. At the intersection of these two X-ray beams a pickup 7 is positioned which comprises a fluorescent screen 8 and photomultiplier tube 9 (Fig. 2).

The two sources of X-rays are connected to a tandem X-ray stabilizer unit 10, such as shown in the copending application of Walter N. Lundahl and Robert L. Wright, Serial No. 25,954, filed May 8, 1948, now Patent 2,492,304, assigned to the same assignee as the present invention, in order that the two X-ray sources have a constant ratio of one to one between the intensity of their respective X-ray beams. The pickup 7 is connected to an amplifier and photomultiplier tube stabilizer 12, which in turn is connected to a sensitivity control 13, with the latter being connected to a discriminator and indicator unit 14. A selective control 15 for controlling the rolling mill screw-downs for adjusting the thickness of the rolled material is also connected to the discriminator and indicator 14.

As will also be noted from Fig. 1, the thickness gauge is provided with a turret mechanism 16 which includes a pair of horizontally rotatable discs 17 and 18, positioned beneath the material 19 to be gauged as it comes from the rolling mill 20, with the outer peripheral edge of these discs 17 and 18 being disposed so as to intercept the X-ray beam from the source 6. In a similar manner the turret mechanism includes a pair of vertically disposed discs 22 and 23 with their outer peripheral edge positioned to intercept the X-ray beam projected by the source 5. Adjacent the discs 17 and 18 is a flag-gauge 24 operated by a solenoid 25 and movable, as hereinafter described, to intercept the X-ray beam from the source 6 and an identical flag-gauge 26 operated by a solenoid 27 is positioned adjacent the discs 22 and 23 which is movable into a position to intercept the X-ray beam from the source 5. The turret mechanism together with its discs 17, 18, 22 and 23, as well as the solenoids 25 and 27, are connected to a decade selector 28.

From Fig. 1, it will be noted that the decade selector 28 is provided with a face panel on which are mounted a plurality of knobs 29, 30 and 32, and a pair of switch levers 33 and 34. The knob 29 is provided with a pointer registrable with graduations corresponding to thicknesses of one-tenth inches, the knob 30 having a pointer registrable with graduations corresponding to one-hundredth inches, and the pointer of knob 32 being registrable with graduations representing one-thousandths inches. The switch lever 33 has two positions, one registering with an indication representing .001 inches and the other representing .003 inches, while the switch lever 34 has three positions noted as "C," "R" and "Z," such switches and knobs being operable for purposes hereinafter described.

As shown in Fig. 2, the turret mechanism 16 is provided with a motor M1 connected by a gear train 35 and a hollow shaft 36 to disc 23, and a motor M2 also connected by a gear train 37 and a shaft 38 concentric with shaft 36, to the disc 22. Also a motor M3 is connected through a gear train 39 and a hollow shaft 40 to disc 18 and a further motor M4 is connected through gear train 42 and concentric shaft 43 to disc 17. The shafts 36—38 and 40—43 are journalled, respectively, in suitable bearings 44 and 45. Disposed between the discs 22 and 23 are a pair of discs 46 and 47 of insulating material which are held stationary by a supporting bracket 48. A similar pair of insulating discs 49 and 50 are disposed between the discs 17 and 18 which are likewise prevented from rotation by a supporting bracket 52. Inasmuch as the structure of the discs 22 and 23, as well as the stationary insulating discs 46 and 47, are identical to that of the discs 17 and 18 and their respective stationary insulating discs 49 and 50, a detailed description of one of such pairs should suffice.

As shown in Figs. 3 and 8, the rear surface of the metallic disc 22 (as well as the rear surface of metallic disc 23) is provided with a plurality of radially disposed insulating blocks of rectangular configuration 53, each of which are equidistant from the axis of the shaft 38 (the blocks on metallic disc 23 being also equally spaced from the axis of shaft 36), with a single rectangular insulating block 54 of twice the width of the blocks 53, being positioned on a smaller radius from the shaft 38 (and shaft 36 on discs 22). Adjacent the peripheral edge of the metallic discs 22 and 23 they are provided with a plurality of metallic inserts 55 ranging from .005 to .014 inches thickness in steps of .001 inches plus a N. S. or "no sample" insert for the disc 22, and ranging from .100 in steps of .01 inches plus a similar N. S. or "no sample" insert for the disc 23.

The opposing stationary insulating discs 46 and 47 are provided with a plurality of spring-pressed metallic plunger-contacts 56 of identical number to that of the insulating blocks 53 and the metallic inserts 55 and which are radially spaced to correspond thereto. However, the axial spacing of these plunger-contacts 56 from the shaft 38 (and shaft 36) is made to correspond to that of the larger area insulating block 54 whereas a single spring-pressed contact 57 axially aligns with the plurality of insulating blocks 53. As can be seen in Figs. 3 and 4, the metallic discs 22 and 23 are electrically grounded, as shown by the respective brush contacts 58 (Fig. 3) and 59 (Fig. 4), while the spring-pressed plunger contacts 56 and 57, carried by the respective stationary insulating discs 46 and 47, are each individually connected to an electrical conductor for a purpose hereinafter described.

Referring now more particularly to the schematic showing of Figs. 9 and 10, it will be noted that the decade selector control knob 29 rotates a shaft 60 which in turn operates a pair of tandem switches 62 and 63. Each of these switches is provided with a movable contact arm 64 and 65, respectively, which align with the pointer on the control knob 29 and which engage with a plurality of radially disposed contact buttons 66 and 67, respectively, as desired, by rotation of the shaft 60 and the movable contact arms 64 and 65 carried by such rotatable shaft. In a similar manner, the knob 30 of the decade selector is secured to a rotatable shaft 68 carrying the movable arms 69, 70, 72, 73, 74 and 75 of six tandem switches, each of which has an identical number of radially disposed contact buttons 76, 77, 78, 79, 80 and 82, respectively. The decade selector control knob 32 is likewise secured to a rotatable shaft 83 with this latter carrying movable arms 84, 85, 86, 87, 88, 89 and 90 of a seven gang tandem switch arrangement with the knob pointer aligning with the movable arms in the same manner as with the two and six gang tandem switch arrangements controlled by knobs 29 and 30. Each switch arm carried by the shaft 83 is movable by an operator to engage one of a plurality of radially disposed contact buttons 96, 97, 98, 99, 100, 102, 103, respectively, making up the seven gang tandem switches. The two position switch 33 of the decade selector rotates a shaft 104 carrying movable arms 105 and 106 of a two gang tandem switch with such arms being engageable with button contacts 107 and 108, or 109 and 110, respectively. The three position switch 34 of the decade selector 28 also rotates a shaft 112 to which is affixed the movable switch arms 115, 116, 117 and 118 of a four gang tandem switch arrangement with each movable switch arm being engageable, at the will of an operator, with its respective "Check," "Run" or "Zero" contact.

Also as shown in Figs. 9 and 10, the button contacts of the tandem switches controlled by knob 30 are numbered 1 to 0 and are thus ten in number, whereas the button contacts of the tandem switches controlled by knob 32 are eleven in number being marked 1 to 0 plus a button contact marked "S." Thus each button contact corresponds to the indicia appearing on the front of the decade selector with which the pointer of knobs 30 and 32 register. In other words, button contact 1 of each tandem switch controlled by knob 30 corresponds to .010, button contact 2 to .020, etc., in steps of .010 each, with the tenth or zero button contact being an N. S. or "no sample" setting as hereinafter explained. In a similar manner, the button contacts controlled by knob 32 align with the indicia on the front of the decade selector with which the pointer of knob 32 registers and represent .011 for button contact 1, .012 for button contact 2, etc., in steps of .001 up to .014, and buttons 5 to 9 representing .005 up to .009, with the zero button contact again representing N. S. or "no sample" and the eleventh button contact S being a "spare." Likewise, the button contacts 66 and 67 of the two gang tandem switch controlled by knob 29 correspond to the indicia appearing on the front of the decade selector with which the pointer of knob 29 registers, with such graduations corresponding to .100, .200, etc.

As shown in Figs. 9 and 10, each button contact 76, of the first tandem switch 69 of the deck controlled by knob 30, is connected by a conductor designated from .010 to .090 and N. S. to the movable contacts of a solenoid or relay 119 and from the fixed contacts of this relay 119 a conductor of the same designation (.010 to .090 etc.) extends respectively to the plunger-contacts 56 carried by the respective insulated discs 47 and 50, which plunger-contacts 56 in Fig. 10 have been designated by the same reference identification as the respective conductors connecting to them, for simplicity of understanding. Also, the No. 1 button contact 67 of switch 63 controlled by knob 29 is connected by a conductor .100 to a movable contact of relay 119 and from a fixed contact of the latter a conductor of the same designation extends to plunger-contact .100 of the respective insulating discs 47 and 50, thus placing the respective plunger-contacts 56 of insulating discs 47 and 50 under the control of relay 119 for connection to tandem switch 69 and its button contacts 76. Likewise, the button contacts 96 of the first tandem switch 84 controlled by knob 32 are individually connected by conductors designated .011; .012; .013; .014; .005; .006; .007; .008; .009; N. S. and S, to the movable contacts of a further solenoid or relay 120 and from the fixed contacts of this relay 120 a conductor of the same designation extends respectively to the plunger-contacts 56 of the respective insulating discs 46 and 49 bearing the same respective designation as the conductors connected to them, which thus places the discs 46 and 49 under control of relay 120 for connection to the tandem switch 84.

From Fig. 9 it will be noted that the button contacts 77 and 78 of the respective tandem switches 70 and 72 are connected in parallel to each other and with button contacts 76 of tandem switch 69. There is this distinction, however, to be noted which is that the tandem switch 70 adds one unit to each of the contacts of tandem switch 69 whereas tandem switch 72 subtracts one unit from tandem switch 69. For example, the .010 conductor which is connected to the No. 1 button of switch contacts 76 also connects in parallel with the No. 2 button of contacts 77 of switch 70 and with the No. 0 button of contacts 78 of switch 72. In a similar manner, conductor .020 connects with No. 2 button of switch contacts 76, with No. 3 button of switch contacts 77 and also with No. 1 button of switch contacts 78. Thus, throughout the range of button contacts 76 of switch 69, the respective contacts 77 of tandem switch 70 which are connected in parallel with the button contacts 76 are one unit higher in the range from 1 to 10, whereas the button contacts 78 of tandem switch 72 are one unit less in the range from 1 to 10 from the respective button contacts 76 of switch 69, with which they are in parallel. There is also one further distinction to be noted which is that the .100 conductor connected to No. 1 button of button contact 67 of switch 63 also connects to the No. 9 button of button contacts 78 of switch 72, and does not connect to any button contacts of the tandem switches 69 or 70.

In a somewhat similar manner the button contacts 96 of tandem switch 84, the button contacts 97 of tandem switch 85, and the button contacts 98 of tandem switch 86 are in electrical parallel with each other. Again, however, there is the same distinction to be noted which is that the button contacts 97 which are in parallel with button contacts 96 are respectively one unit less than that of button contacts 96, and button contacts 98 which are in electrical parallel with button contacts 96 are three units, respectively, below the latter. This may be readily appreciated by taking, for example, just one conductor .005 which, as shown in Fig. 9, is connected to button No. 5 of button contacts 96 for switch 84, also to button No. 4 of button contacts 97 for switch 85, and which is also connected to button No. 2 of button contacts 98 for switch 86.

Regarding button contacts 79 of tandem switch 73, the majority thereof are not used, but buttons Nos. 1 and 2 are bridged together and connected by a conductor 122 to switch arm 64 of tandem switch 62, which conductor 122 also connects to a bridge of buttons Nos. 5 to 9, 0 and S, inclusive, of button contacts 103 of tandem switch 90, while the movable arm of tandem switch 73 is connected by a conductor 123 to bridged buttons Nos. 1 to 4, inclusive of button contacts 103 of tandem switch 90. Buttons Nos. 1 to 9, inclusive, of button contacts 80 of tandem switch 74 are bridged together and connected by a conductor 125 to a bridge of buttons Nos. 1 to 9, inclusive, of button contacts 82 of tandem switch 75; with this same conductor 125 connecting with a bridge of buttons 5 to 9, 0 and S of button contacts 99 of tandem switch 87, to the movable arm of tandem switch 69, and also to the No. 0 button of button contacts 67 of tandem switch 63. The No. 0 button of button contacts 80 of tandem switch 74 is connected by a conductor 126 of the movable arm 65 of tandem switch 63 while the movable arm of tandem switch 74 is connected by a conductor 127 to the No. 0 button of button contacts 82 of tandem switch 75 which conductor 127 also connects to a bridge of buttons Nos. 2 to 6, 8 and 9, inclusive, of button contacts 100 of tandem switch 88. Movable arm of tandem switch 75 is connected by a conductor 128 to a bridge of buttons Nos. 4 to 8, inclusive, of button contacts 102 of switch 89.

Referring now to tandem switch 87, its bridge of buttons Nos. 1 to 4, inclusive, of button contacts 99 are connected by a conductor 129 to the movable arm of tandem switch 70 and also to bridged buttons Nos. 1, S, 0 of button contacts 100 of switch 88, as well as to bridged buttons Nos. 0, S and 1 to 3, inclusive, of button contacts 102 of tandem switch 89. The movable arm of tandem switch 87 is connected by a conductor 130 to the winding 144 of motor M1, (through terminal b of Fig. 9 to terminal b Fig. 10), as well as this conductor 130 being connected to the "Zero" contact of tandem switch 116. The next tandem switch 88 in the bank has its No. 7 button of button contacts 100 connected by a conductor 132 to the movable arm of tandem switch 72 with such conductor also connected to the No. 9 button of button contacts 102 of tandem switch 89, while the movable arm of tandem switch 88 is connected by a conductor 133 to contact 110 of the tandem switch 106 controlled by switch lever arm 33. Movable arm of tandem switch 89 is connected by a conductor 134 to contact 108 of switch 106, while movable arm of tandem switch 90 is connected by a conductor 135 to both the "Check" and "Zero" contacts of tandem switch 117 which is operable by switch lever 34, with such conductor 135 also extending (terminal f Fig. 9 to terminal f Fig. 10) to one end of the winding of solenoid 27 (Fig. 10).

Movable arms of tandem switches 105 and 106 are connected to the respective "Check" contacts of tandem switches 115 and 116 by the respective conductors 136 and 137 while contact 107 of switch 105 is connected by a conductor 138 to the movable arm of tandem switch 85 and likewise contact 109 of tandem switch 105 is connected by a conductor 139 to the movable arm of tandem switch 86.

Movable arm of tandem switch 84 is connected by a conductor 140 (through terminal a Fig. 9 to a Fig. 10), to one end of the shading field winding 142 of motor M2 (Fig. 10) with this conductor 140 also being connected to the "Zero" contact of tandem switch 115.

Considering now the four tandem switches controlled by knob 34, the "Run" contact of tandem switch 115 is connected by a conductor 145 (terminal c Fig. 9 to c Fig. 10) to a junction 146 where it is connected to the N. S. conductor extending to the insulating disc 46 or 49, as well as to the buttons 0, 9 and 7 on the tandem switches 84, 85, and 86, respectively through the contacts of relay 120. The movable arm of this tandem switch 115 is connected by a conductor 147 (terminal d Fig. 9 to d Fig. 10) to one end of the shading field winding 148 of motor M4 (Fig. 10).

Likewise the "Run" contact of tandem switch 116 is connected by a conductor 149 (terminal e Fig. 9 to e Fig. 10) to a junction 150 where it connects to the N. S. conductor extending from the insulating disc 47 or 50 as well as from the buttons Nos. 0 and 1 of tandem switches 69 and 70, respectively through the contacts of relay 119. The movable arm of this tandem switch 116 is connected by a conductor 152 (through terminal h Fig. 9 to h Fig. 10) to one end of the shading field winding 153 of motor M3 (Fig. 10). The movable arm of tandem switch 117 is connected by a conductor 154 (through terminal g Fig. 9 to g Fig. 10) to one end of the winding of solenoid 25. In a similar manner the "Check" and "Zero" contacts of tandem switch 118 are bridged (the "Run" contact being blank) and connected by a conductor 151 to one end of the winding of the respective relays 119 and 120.

Referring now more specifically to Fig. 10, it will be noted that the main field windings F1, F2, F3 and F4 of the respective motors M1, M2, M3 and M4 are continuously energized from the source of supply L1, L2 of the customary commercial potential so long as the main line switch 155 remains closed. Also, the remaining end of the winding of the respective solenoids 25 and 27 are also connected to one side of the supply source L2, while the other side of the supply source L1 is connected (through terminal i Fig. 10 to i Fig. 9) to the movable arm of tandem switch 118 and to the No. 1 button of button contacts 66 of tandem switch 62 controlled by knob 29. As shown clearly in Fig. 10, the center point of each of the shading field windings of the motors M1, M2, M3 and M4 is connected to ground at G and the remaining end of each of these shading field windings is connected by conductors 156, 157, 158 and 159 through a fixed resistor 162, 163, 164 and 165, respectively, to the plunger-contact 57 carried by the insulating discs 46, 47, 49 and 50, respectively. These motors M1 to M4, inclusive, are of a somewhat unorthodox type in that, although their main field winding is continuously energized, the rotor will not rotate until a portion of the shading field winding is short-circuited, with direction of rotation being determined by the particular portion of the shading field winding actually short-circuited. Also, as previously mentioned, the ground G for the motors M1, and M2 is independent of the ground G for the motors M3 and M4, due to the fact the respective mechanisms are insulated from each other.

The present invention may be better understood by a description of a specific operation. Assuming, therefore, that the thickness of the material 19 which at the moment it is desired to roll on the mill 20 is to be of .046 in thickness. Accordingly, the operator first sets his "standard" gauge for this thickness. To do this the operator rotates knob 29 to make its pointer align with the 0 graduation on the front of the decade selector 28 which also moves the arm 64 of tandem switch 62 so as to engage the No. 0 button of button contacts 66 and at the same time rotates arm 65 of tandem switch 63 so that it likewise engages the No. 0 button of button contacts 67. Next knob 30 of the decade selector 28 is rotated until its pointer registers with the No. 4 graduation on the front panel of the decade selector. Since rotation of knob 30 also rotates shaft 68, the movable arms of the tandem switches 69, 70, 72, 73, 74, and 75 will also be rotated into contact with the No. 4 button of their respective contact buttons 76, 77, 78, 79, 80 and 82; as shown in Fig. 9. Likewise knob 32 is rotated until its pointer registers with the No. 6 graduation on the front panel of the decade selector 28 and since this also rotates shaft 83, the movable arms of the tandem switches 84, 85, 86, 87, 88, 89 and 90 are rotated until they contact the No. 6 button of the respective button contacts 96, 97, 98, 99, 100, 102, and 103, also as shown in Fig. 9. At this particular moment the position of the switch lever arm 33 which rotates the arms of tandem switches 105 and 106 is immaterial, but switch lever arm 34 is moved to its R or "Run" position, which simultaneously moves the arms of tandem switches 115, 116, 117 and 118 into engagement with their respective "Run" contact.

The main line switch 155 (Fig. 10) being closed will energize the main field windings F1, F2, F3 and F4 of the motors M1 to M4, inclusive, as well as one side of the line (L2) being supplied to one end of the winding of solenoids 25 and 27 and to one end of winding of relays 119 and 120. The various tandem switches being now in their respective positions as just described and as shown on Fig. 9, a circuit is completed to the forward or left hand portion of the shading field winding 142 of motor M2 as shown in Fig. 10. This circuit is shown in a heavy line and extends from one end of such winding 142, through conductor 140 (also terminal a Fig. 10 to a Fig. 9) rotatable arm of tandem switch 84, conductor .006 to movable contact of relay 120 (now deenergized and engaging its lower fixed .006 contact) and thence through the .006 conductor to the No. .006 plunger-contact 56 of insulating disc 46 (Fig. 10) and, since this plunger contact 56 engages the metallic disc 22 which is grounded through its shaft 38 or brush contact 58, the circuit is completed to the left or F half (as viewed from Fig. 10) of the shading field winding 142 through the ground connection G of its center tap.

At the same time, current of a reduced value will also flow through the right or R half (again viewed from Fig. 10) of the shading field winding 142 from the end thereof through conductor 156 and resistor 162 to plunger-contact 57 carried by insulating disc 46 which, being in engagement with the grounded metallic disc 22, completes the circuit to the center tap of the shading field winding 142. The purpose of the resistor 162 is to prevent the magnetic flux of the R portion of the winding 142 from overcoming the magnetic flux from the forward or F portion of such winding but the resistor 162 is of such value that satisfactory reverse torque of the motor M2 is obtained as hereinafter explained. Accordingly, the motor M2 will rotate in the forward direction, such as shown by the arrow in the schematic showing of Fig. 6, with the closed circuit as above traced indicated by the heavy lines. Rotation of motor M2 rotates shaft 38 and the metallic disc 22 until the No. .006 plunger-contact 56, radially aligned with the metallic insert 55 of .006 thickness rides over the larger area rectangular insulating block 54 carried by the metallic disc 22. This interrupts the circuit to the forward or F portion of the winding 142 thus stopping rotation of the disc 22 with the .006 thickness insert properly aligned with the X-ray beam which emanates from the "standard" X-ray tube source 5.

There is, however, the possibility that the disc 22, together with the motor M2 and the gear train 37, will coast slightly thereby misaligning the desired metallic insert with the X-ray beam as shown in Fig. 7. To compensate for any such coasting or vibratory movement, and thus assure proper alignment of the metallic insert 55 with the X-ray beam, the larger area rectangular insulating block 54 permits the contact 56 to travel beyond perfect alignment without again closing the circuit to the forward or F portion of winding 142. However, any such coasting or vibratory movement will cause the plunger contact 57 to again engage the metallic disc 22, thus completing the circuit as previously traced, to the reverse or R portion of shading field winding 142, as shown by the heavy line in Fig. 7, causing a reverse rotation of motor M2 and disc 22 until the plunger-contact 57 rides on the smaller area insulating block 53 at which time the circuit to both portions of the motor winding 142 will be interrupted, with attendant complete alignment of the insert or opening 55 with the X-ray beam from the source 5, as shown in Fig. 5.

Simultaneously, with rotation of disc 22 in the manner above described, the metallic disc 23 also is rotated by its motor M1 to align the .040 metallic insert with the X-ray beam from the source 5. The circuit to the motor M1, and as shown in heavy line, extends from one end of winding 144 through conductor 130 (to terminal b Fig. 10 to terminal b Fig. 9), to movable arm of tandem switch 87 which is in engagement with the bridge of buttons Nos. 5 to 9, 0 and S, of button-contacts 99, thence by means of conductor 125 to the movable arm of tandem switch 69 which is now in engagement with its No. 4 button of button-contacts 76, through conductor .040 to the movable contact of relay 119 (now deenergized and engaging its lower fixed .040 contact) and thence through the .040 conductor to the .040 contact of plunger-contacts 56 carried by insulating disc 47, and since such plunger contact engages the metallic disc 23 the circuit is completed through shaft 36 or brush 59 to ground and from ground G to the center tap of shading field winding 144. The motor M1 accordingly rotates until the .040 plunger-contact 56 rides over the larger area insulating block 54 carried by the metallic disc 23 thus interrupting the circuit to motor M1. Again should there be any coasting or vibratory movement tending to misalign the .040 metallic insert 55 with the X-ray beam from source 5, the plunger-contact 57 will complete the circuit to the reverse or R portion of motor winding 144, thus reversing rotation until such circuit is interrupted by plunger-contact 57 riding on the smaller area insulating block 53 radially aligned with the .040 insert 55 and correctly aligning the insert with the beam, in the identical manner as previously described relative to metallic disc 22 and as shown in Figs. 5, 6 and 7.

The operator having now set the discs 22 and 23 so as to impose metallic inserts 55 having a total thickness of .046 in alignment with the X-ray beam from the "standard" source 5, it will be noted that with the tandem switches controlled by the knob 34 in the "Run" position a circuit is likewise simultaneously completed to the motor M3 and M4 so as to align the "no sample" or N. S. opening in the metallic discs 17 and 18 in alignment with the X-ray beam from the X-ray source 6. For example, a circuit to the motor M4 is completed from one end of the shading field winding 148 through conductor 147 (terminal d Fig. 10 to terminal d Fig. 9) to the movable arm or tandem switch 115 now in engagement with the "Run" contact thence through conductor 145 (terminal c Fig. 9 to terminal c Fig. 10) to the junction 146 which connects with the N. S. conductor extending to the plunger contact N. S. carried by the insulating disc 49 which, being in engagement with the metallic disc 17 in turn grounded by the shaft 43 or brush 58, completes the circuit to the motor from the ground G to the center tap of the motor winding 148, as shown by the heavy lines. Accordingly, the motor M4 rotates shaft 43 together with the metallic disc 17 until the N. S. plunger contact rides over the large area insulating block 54 to interrupt the motor circuit, thus aligning the N. S. opening 55 with the X-ray beam from the "test" source 6. If, however, there is any coasting or vibratory motion tending to carry the insert or N. S. opening 55 out of alignment with the X-ray beam, the reverse or R portion of the winding 148 is energized to cause reversal of the motor in the precise manner as previously described regarding the reverse operation of motors M1 and M2. Moreover, it will be noted that when motor M4 is energized, there is no feed back which affects motor M2 because the N. S. conductor extending from the junction 146 to the upper N. S. fixed contact of relay 120 is now open, since the movable N. S. contact of this relay at the moment is engaging the lower N. S. fixed contact connected to disc 46.

In a similar manner a circuit is closed to the shading field winding 153 of motor M3 which extends from one end of the winding through conductor 152 (terminal h Fig. 10 to terminal h Fig. 9) to the movable arm of tandem switch 116 now in engagement with its "Run" contact and thence by conductor 149 (terminal e Fig. 9 to terminal e Fig. 10) to a junction 150 connected to the "no sample" or N. S. plunger contact of insulating disc 50 which plunger-contact engages the metallic disc 18 and thence to ground through shaft 40 or brush 59 and from ground G to the center tap of field winding 153, as shown in heavy lines.

The motor M3 will thus rotate the metallic disc 18 until the contact-plunger N. S. rides over the large area insulating block 54 to interrupt the forward or F portion of the field winding 153 which thus aligns the N. S. opening with the X-ray beam from the "test" source 6 in the precise manner as previously described, with any coasting or vibratory movement tending to cause misalignment being corrected by reversal of the motor M3, in the same manner as above mentioned with respect to the other motors. It will again be noted that when motor M3 is energized, there is no feed back which affects motor M1, because the N. S. contact extending from the junction 150 to the upper N. S. fixed contact of relay 119 is now open, since the movable N. S. contact of this relay at the moment is engaging the lower N. S. fixed contact connected to disc 47.

Having now set the gauge for a standard thickness of .046, the next operation is for the operator to check for the null point accuracy of the reading instrument. Accordingly, the switch lever arm 34 is then moved to the Z position, as shown on the front of the decade selector, which moves the tandem switch arms 115, 116, 117 and 118 into engagement with their respective "Zero" contacts. The movement of switch arm 118 will cause energization of the winding of relays 119 and 120 with raising of their respective movable contacts into engagement with their upper fixed contacts bearing the same designation. The respective motors M1 and M2 will remain stationary as the previously traced circuits thereto are now interrupted by the movement of the contacts of the relays 119 and 120. However, new circuits are now completed to the shading field windings of motors M3 and M4 for the purpose of rotating the respective metallic discs 17 and 18 to align the metallic inserts 55 now carried thereby which have the identical thickness, namely, .040 and .006, in alignment with the X-ray beam from the "test" source 6. The circuit to the motor M4 may now be traced from one end of the shading field winding 148 through conductor 147 (terminal d Fig. 10 to terminal d Fig. 9) to the movable arm of tandem switch 115 now in engagement with its "Zero" contact, thence by means of conductor 140 to the movable arm of tandem switch 84 now engaging the No. 6 button of button-contacts 96, through conductor .006 to the movable .006 contact of relay 120 now engaging its upper fixed .006 contact and thence through the .006 conductor to the .006 plunger contact 56 carried by insulating disc 49 which is now in engagement with the metallic disc 17 and thus to ground through shaft 43 or brush 58 and from ground G to the center tap of field winding 148. Inasmuch as the N. S. opening 55 in disc 17 was previously aligned with the X-ray beam from "test" source 6, the metallic disc 17 will now rotate in a forward direction, such as shown by the arrow in Fig. 6, and when the .006 plunger contact 56 rides over the large area insulating block 54, the previously traced circuit to the motor winding 148 will thus be interrupted aligning the .006 insert 55 with the X-ray beam from the "test" source 6 which corresponds precisely to the .006 insert carried by the metallic disc 22 now in alignment with the X-ray beam from the "standard" source 5.

Simultaneously, the circuit to shading field winding 153 of motor M3 is likewise completed which circuit extends from one end of the winding 153 through conductor 152 (terminal h Fig. 10 to terminal h Fig. 9) to the movable arm of tandem switch 116 now engaging its "Zero" contact, thence by means of conductor 130 to the movable arm of tandem switch 87 now engaging the No. 6 button of bridged buttons 5 to 9, 0, S, inclusive, of button-contacts 99, through conductor 125 to the movable arm of tandem switch 69 now engaging its No. 4 button of button-contacts 76, through conductor .040 to the movable .040 contact of relay 119 now engaging its upper fixed .040 contact and thence through the .040 conductor to the .040 plunger-contact 56 carried by insulating disc 50 and engaging the metallic disc 18, the latter of which is grounded through its shaft 40 or brush 49 and thence from ground G to the center tap of shading field winding 153.

Motor M3 is accordingly rotated in a forward direction, again as shown by the arrow in Fig 6, until the .040 plunger-contact 56 rides over the large area insulating block 54 to interrupt the circuit to the motor winding 153, at which time the .040 insert 55 carried by the metallic disc 18, will be in alignment with the X-ray beam from the "test" source 6 as well as with the .006 insert 55 carried by the disc 17.

Accordingly, inserts having a total thickness of .046 will now be interposed in the path of the X- ray beam from the "standard" source 5 and inserts having a similar thickness will be interposed in the X-ray beam from the "test" source 6. Inasmuch as both X-ray beams after passing through the respective inserts operate the pick-up 7 which is amplified as previously described, the null meter should now indicate precisely zero, showing that the entire thickness gauge is properly set and functioning due to a complete balance of the test inserts carried by discs 17 and 18, with the standard inserts of like thickness carried by the standard discs 22 and 23.

In order now to still further check the accuracy of the thickness gauge setting, the operator moves the switch lever arm 34 to the c position on the decade selector 28 which accordingly moves the arms of tandem switches 115, 116, 117 and 118 into engagement with their respective "Check" contacts. The respective motors M1 and M2 will still remain stationary since the circuit thereto is again broken by the relays 119 and 120, as movement of arm 118 to its "Check" position immediately reenergizes the winding of the relays 119 and 120 and at the same time the previously traced circuit to the windings 153 and 158 of the motors M3 and M4, respectively, are likewise interrupted by these relays 119 and 120. It will be recalled that at the instant of movement of the switch lever arm 34 to the "Check" position, the metallic discs 18, 23 had their .040 insert in alignment with the X-ray beam from the respective sources 5 and 6 and likewise the .006 inserts carried by the discs 17, 22 had their .006 insert in alignment with the X-ray beam from the respective sources 5 and 6.

Consequently, the discs 22 and 23 carrying the "standard" inserts remain undisturbed since the circuit to the respective motors M1 and M2 remains interrupted by the relays 119 and 120 as above noted. However, upon movement of the arm of tandem switch 115 to its "Check" contact a circuit to the winding 148 of motor M4 is now completed through a circuit which extends from one end of the winding 148 through conductor 147 (terminal d Fig. 10 to terminal d Fig. 9) the movable arm of switch 115 now in engagement with its "Check" contacts, thence by means of a conductor 136 to the movable arm of tandem switch 105 shown in engagement with its contact terminal 109, through conductor 139 to the movable arm of tandem switch 86 now engaging the No. 6 button of its button contacts 98 through the .009 conductor to the movable .009 contact of relay 120 now engaging its upper fixed .009 contact and thence by the .009 conductor to the .009 plunger-contact 56 carried by insulating disc 49 and now engaging the metallic disc 17, thence to ground through shaft 43 or brush 58 and from ground G to the center tap of winding 148. Again the forward or F portion of winding 148 is energized, which causes rotation of metallic disc 17 until the .009 metallic insert 55 aligns with the X-ray beam from "test" source 6.

However, disc 18 which still has its .040 metallic insert 55 in alignment with the X-ray beam from the "test" source 6 remains stationary, since its driving motor M3 is not energized due to interruption of the circuit to the field winding 153 by the .040 plunger contact 56 of the disc 50 resting on the large area insulating block 54 carried by disc 18. While the circuit to the winding 153 remains interrupted by such plunger contact, a change is nevertheless made in the circuit previously extending to such winding. Such change results from the fact that when the movable arm 116 engages its "Check" contact, a by-pass circuit is completed to a portion of the previously described circuit, extending to the movable arm of tandem switch 69. Such by-pass circuit extends from the "Check" contact terminal of tandem switch 116 through conductor 137 to the movable arm of tandem switch 106 now engaging its terminal 119, thence by conductor 133 to the movable arm of tandem switch 88 now engaging its No. 6 button of button-contacts 100, thence by conductor 127 to the movable arm of tandem switch 74 now engaging its No. 4 button of button contacts 99 and thence by means of conductor 125 to the movable arm of tandem switch 69 forming part of the .040 circuit to the motor M3 as previously traced. Owing to the fact that, under the conditions previously described the switch lever arm 33 was in registration with its .003 graduation on the decade selector 28, which thus placed the tandem switch arms 105 and 106 in engagement with their respective contacts 109 and 119, this caused rotation of the metallic disc 17, from its previous position with the .006 metallic insert 55 in alignment with the X-ray beam from "test" source 6, to position its .009 metallic insert 55 in alignment with the X-ray beam 6. The thickness reading instrument, or null meter, should now indicate that the thickness of the metal interposed in the X-ray beam from the "test" source 6 is .003 above standard, since the total thickness of the metal interposed in the X-ray beam from the "Standard" source 5 totaled only .046. In order to still further check the indication of the thickness reading instrument or null meter, the operator now moves the switch lever arm 33 to cause it to register with the .001 graduation on the decade selector 28.

Such movement rotates the shaft 104 causing the movable arms of tandem switches 105 and 106 to leave their respective contacts 109 and 119 and to engage their contacts 107 and 108. This movement accordingly again completes a circuit to the shading field winding 148 of the motor M4 which extends from one end of the winding 148 through conductor 147 (terminal d Fig. 10 to d Fig. 9) to the movable arm of tandem switch 115 still engaging its "check" contact, thence through conductor 136 to the movable arm of tandem switch 105 now engaging its .01 contact 107, through conductor 138 to the movable arm of tandem switch 85 which is engaging its No. 6 button of button-contacts 97 and then through the .007 conductor to the movable .007 contact, now still engaging its upper fixed .007 contact, and thence through the .007 conductor to the No. .007 plunger-contact 56 on insulating disc 49 which being in engagement with the metallic disc 17 connects again to ground through motor shaft 43 or brush 58 and from ground G back to the center tap of shading field winding 148.

The motor accordingly rotates metallic disc 17 until its .007 metallic insert 55 aligns with the X-ray beam from "test" source 6 and with the .040 metallic insert 55 carried by metallic disc 18 which has again remained stationary despite a slight change in circuit connects. For example, the circuit from the winding 153 up to the movable arm of the tandem switch 106 remains the same. However, the latter now engages its .001 contact 108 thus interrupting the previously traced part of the circuit including the tandem switches 88 and 74 but now completing a by-pass circuit extending from the contact 108 through conductor 134 to the movable arm of tandem switch 89 engaging its No. 6 button of bridged button-contacts 102, thence through conductor 128 to the movable arm of tandem switch 75 engaging its No. 4 button of bridged button-contacts 82 and thence through common conductor 125 to the movable arm of tandem switch 69 included in the previously traced circuit which is interrupted by the .040 plunger-contact 56 carried by insulating disc resting on the insulating block 54.

Movement of the switch lever 33 to its .001 position thus caused the .007 metallic insert 55 carried by metallic disc 17 to move into alignment with the beam from test source 6 and the .040 insert 55 carried by metallic disc 18, now making a total thickness of .047, compared with the .046 thickness interposed by the inserts carried by discs 22 and 23 in the X-ray beam from the "Standard" source 5. The null meter will accordingly record a deflection from its "Zero" graduation to a .001 graduation instead of the .003 graduation as recorded when the switch lever 33 was in its .003 position. It will be noted that when the operator makes his .001 or .003 check, an insert of either of these thicknesses is not added to the total thickness of the "balance" or "Zero" check but instead a metallic insert of either the .001 or .003 greater than the particular thousandths (.000) insert in the path of the "standard" X-ray beam is moved into position to intercept the "test" X-ray beam. Moreover, by stepping the connections, as previously mentioned, between the button-contacts of the respective tandem switches 69, 70 and 72, whereby tandem switch 70 adds one unit to that of tandem switch 69 while tandem switch 72 subtracts one unit from switch 69, this causes movement of the disc 17 with its thousandths (.000) inserts, while maintaining the circuit to the motor for disc 18 carrying the hundredths (.00) inserts interrupted, despite a slight change in a part of such motor circuit by operation of the switch lever 33 and its tandem switches 105 and 106. Also, since the circuit to the motors M1 and M2 was interrupted by the relays 119 and 120, there has been no change in the .046 "standard" setting of the discs 22 and 23.

Having now made a "balance" or "Zero" check and both a .001 and .003 check and the entire thickness gauge having been found to be accurate, it is now ready for operation to measure the material 19 of .046 thickness as it comes from the rolling mill 20. The operator now accordingly moves the switch arm 34 back to its "Run" position, which again partially closes the previously traced circuits to the shading field winding of the motors M1 and M2, since relays 119 and 120 are deenergized upon movement of tandem switch 118 to its "Run" position, but since the circuits to the windings 142 and 144 are still interrupted, due to their respective .040 and .006 plunger contacts 56 resting on their insulating block 54, the motors are not energized, with the result that the "standard" discs 22 and 23 remain in position interposing metallic inserts 55 having a total thickness of 0.46 in position to intercept the X-ray beam from the "standard" source 5. However, upon movement of the switch lever 34 as just mentioned, the tandem switches 115, 116 and 117 are likewise again returned to their "Run" position which immediately completes a circuit to the shading field windings 148 and 153 of the respective motors M4 and M3, as previously traced. Thus, regardless of the momentary setting of the "test" discs 17 and 18, they will be rotated until their respective N. S. or "no sample" opening aligns with the X-ray beam from the "test" source 6. The rolling mill 20 is then started and the only thickness thereafter interposed in the path of the X-ray beam from the "test" source 6 is that of the material 19, the N. S. positions of the discs 17 and 18 being merely openings without inserts. So long as such material remains at the thickness of the .046 set as "standard" by the discs 22 and 23, the null meter will read 0 but upon any variation from such thickness by the material 19 it will be indicated in thousandths by the meter deflection.

The foregoing example assumed a thickness of .046 for the "standard" setting and that desired for the material 19 as it came from the rolling mill 20. Should a thickness of say .146 be desired, the operator need only rotate the knob 29 until its pointer registers with the .1 graduation on the selector panel 28. Since such rotation of knob 29 also rotates, the shaft 62 tandem switch arm 64 is moved away from its previous 0 button into engagement with the No. 1 button of button contacts 66 and in a similar manner tandem switch 65 also leaves its 0 button and engages its No. 1 button of button contacts 67. So far as tandem switch 65 is concerned at this time, it merely connects the 0 button of button contacts 80 of tandem switch 74 through conductor 126 to the No. .100 conductor, instead of to the conductor 125 as was previously the case. However, the engagement of tandem switch 64 with its No. 1 button closes a circuit to the winding of the solenoid 27 which extends from one side of the supply source L1 (terminal *i* Fig. 10 to terminal *i* Fig. 9) to the No. 1 button of button contacts 66, through tandem switch arm 64 and conductor 122 to the bridged button contacts 103 of tandem switch 90, thence through conductor 135 (terminal *f* Fig. 9 to terminal *f* Fig. 10) to one end of the winding of solenoid 27 and since its other end is connected to the other side of the supply source L2, the solenoid 27 is accordingly energized. Upon such energization the solenoid retracts its armature against the tension of a coil spring thus moving the flag-gauge 26 into position to be intercepted by the X-ray beam from the "standard" source 5 where it remains so long as a thickness of .100 to .199 is desired. Of course the thickness of the flag-gauge 26 may be altered as occasion necessitates by substituting a gauge of .200 or .300 for the .100 gauge in which event the knob 29 is rotated to align its pointer with the desired graduation on the selector panel 28.

In order to properly check the entire thickness gauge for thicknesses of .100 or .200, etc., a similar flag-gauge 24 is provided which is automatically positioned to be intercepted by the X-ray beam from the "test" source 6 when the switch lever 34 is moved to its "Check" or "Zero" positions. This is accomplished by movement of the tandem switch arm 117. By reference more particularly, to Fig. 9, it will be noted that when in the "Run" position of switch lever 34 the "Run" contact of tandem switch 117 is effectively a blank contact, whereas the "Zero" and "Check" contacts are bridged together and also connected to the conductor 135. Since this latter conductor is a part of the circuit as above traced for energizing the winding of the solenoid 27, it follows that when the tandem switch arm 117 engages either its "Check" or "Zero" contacts the winding of the solenoid 25 is connected in parallel with the winding of the solenoid 27. This is due to the fact that the tandem switch arm 117 is connected by conductor 154 (terminal g Fig. 9 to g Fig. 10) directly to one end of the winding of solenoid 25. Accordingly, during the "Check" and "Zero" positions of the tandem switch 117 both solenoids 25 and 27 are energized thus positioning a flag-gauge 24 and 26, respectively, of identical thickness in the path of both the "standard" source 5 and the "test" source 6. However, upon return of the switch lever 34, together with the tandem switch 117, to the "Run" position, the winding of solenoid 25 is deenergized while the solenoid 27 alone remains energized to maintain its flag-gauge 26 in the path of the beam from the "standard" source 5, so long as the knob 29 remains with its pointer in alignment with any graduation other than its 0 graduation and upon movement of the pointer of knob 29 to this 0 graduation, the solenoid 27 is then deenergized.

As previously pointed out, the metallic inserts 55 carried by the metallic discs 18 and 23 consecutively increase in steps of .010 while the metallic inserts 55 carried by the metallic discs 17 and 22 likewise increase in steps of .001 but not necessarily consecutively throughout their entire range since there is a gap between the insert 55 of .009 thickness and that of .011. This is because an insert 55 carried by the metallic discs 18 and 23 has a thickness of .010 so that when the latter thickness is desired only this insert is positioned by the discs 18 and 23 in the path of the X-ray beams from the sources 5 and 6 while the discs 17 and 22 will align their respective N. S. or no sample, opening with the X-ray beams and the inserts of .010 thickness. Also, for certain thicknesses, the inclusion of the respective pairs of inserts are automatically additive in a slightly different manner, to give the desired total merely by setting of the pointers of the knobs 30 and 32 to the proper desired graduation.

This may be better appreciated by taking as an example a thickness setting of say .054. The operator will as previously mentioned rotate knob 30 until its pointer aligns with the No. 5 graduation and similarly the pointer of knob 32 is aligned with its No. 4 graduation. Such rotation of knob 30 accordingly rotates the tandem switches 60, 70, 72, 73, 74 and 75 into engagement with the No. 5 button of their respective button contacts and tandem switches 84, 85, 86, 87, 88, 89 and 90 are rotated by knob 32 until they engage the No. 4 button of their respective button contacts. Although the No. 5 button of button contacts 76 of tandem switch 69 is connected through the .050 contacts of relay 119 to the .050 conductor extending to plunger-contact 56 of insulating disc 46, this conductor is not placed in circuit because of the fact the previously traced circuit which included tandem switch 69 is open at tandem switch 87 since the latter now engages its No. 4 button of its button-contacts 99. Accordingly, for this assumed setting of .054 tandem switch 69 may be disregarded. Moreover, inasmuch as the previously traced circuit for the motors M1 and M2 at the .046 thickness setting clearly indicated that the conductors 130 and 140, respectively, formed part of their energizing circuits, these conductors may be taken from Fig. 9 as the motors, for illustrative purposes.

At the assumed setting of .054, it will be noted that conductor 130, which connects to tandem switch 87, now completes the circuit to the No. 4 button of its button-contacts 99 and that such No. 4 button is connected by conductor 129 to the arm of tandem switch 70. The latter, however, is now in engagement with its No. 5 button of button-contacts 77 but such No. 5 button connects with the .040 movable contact engaging the lower fixed .040 contact of relay 119 and to the .040 conductor extending to the insulating disc 47 since the button-contacts actually add one unit to the button-contacts 76 of tandem switch 69. By this differential, although the arm of tandem switch 70 is in engagement with its No. 5 button, since the button adds one unit, as previously mentioned, to the button-contacts 76 of tandem switch 69, such No. 5 button actually is connected to the .040 conductor. This accordingly now completes a circuit, as previously traced, until the .040 insert 55 carried by the metallic disc 23 is rotated into alignment with the X-ray beam from the "standard" source 5 by the motor M1 (unless it should happen that the .040 insert 55 of the disc 23 were already in such position, in which event the disc 23 will remain stationary), despite the setting of the pointer of knob 30 at its No. 5 graduation.

At the same time the setting of the pointer of knob 32 at its No. 4 graduation causes the tandem switch 84 to be moved to its No. 4 button of the button-contacts 96 and since this No. 4 button is connected through the .014 movable contact engaging the lower fixed .014 contact of relay 120 to the .014 conductor, a circuit is completed from conductor 140 through tandem switch 84, conductor .014 and the .014 contacts of relay 120 to the .014 plunger-contact 56 on insulating disc 45, until the motor M2 rotates the .014 insert 55 carried by metallic disc 22 into alignment with the X-ray beam from the "standard" source 5. The automatic positioning of the .040 and the .014 inserts 55 carried by the respective metallic discs 23 and 22 in alignment with the X-ray beam from the "standard" source 5 thus makes a total thickness of .054 which is the setting selected by the knobs 30 and 32 on the selector panel 28. By the same token, movement of the switch lever 34 to its "Zero" position will in no way disturb the circuit connections to the motors M1 and M2 as the circuits thereto will be interrupted due to energization of relay 120 by movement of tandem switch 118 to its "Zero" position, resulting in the discs 22 and 23 remaining in their position interposing the total of .054 thickness in the X-ray beam. Such movement will now, however, complete energizing circuits to the motors M3 and M4 in the manner previously traced due to energization of the relays 119 and 120 by movement of tandem switch 118, except that the .040 and .014 contacts of relays 119 and 120, together with the conductor .040 and .014 respectively, are now part of the energizing circuit for the motors M3 and M4. The .040 metallic insert 55 and the .014 metallic insert 55 carried by the respective discs 18 and 17 are accordingly rotated into alignment with the X-ray beam from the source 6, so that a "balance" or "Zero" check can be made in the same manner as previously described with respect to the originally assumed setting of .046.

Having made such check with the null meter being undeflected, the switch lever 34 may then be moved to its "Check" position. Again the circuits to all motors M1 to M4 inclusive to the windings of relays 119 and 120, are interrupted by the tandem switches 115, and 116, but additional circuits are now completed to the motors M3 and M4 by switches 115 and 116, as well as the energizing circuit for the windings of relays 119 and 120 being again closed by the movement of tandem switch 118 to its "check" position. This accordingly causes these latter motors M3 and M4 to become energized with such circuits depending upon the setting of switch lever 33 for the .003 or .001 setting. Taking first the .003 setting of tandem switches 105 and 106 as shown in Fig. 9, the circuit for the motors M3 will now extend from one end of shading field winding 153 through conductor 152 (terminal $h$ Fig. 10 to $h$ Fig. 9), tandem switch 116, "Check" contact thereof and conductor 137 to tandem switch 106, contact 110, conductor 133 to arm of tandem switch 88 now engaging its No. 4 button of its bridged button-contacts 100, conductor 127 to arm of tandem switch 74 now engaging its No. 5 button of bridged button-contacts 80, thence by conductor 125 to arm of tandem switch 69 now engaging its No. 5 button of button-contacts 76.

It will be recalled that this switch 69 was not previously in the circuit, but on the contrary a circuit was made through tandem switch 70 to the .040 conductor which thus previously energized motors M1 and M3 to position their respective .040 insert 55 in the path of the X-ray beam from the sources 5 and 6. Moreover, since the circuit to the motor M1 is interrupted at the moment by the contacts of relay 119, the .040 insert carried by metallic disc 23 still remains in the path of the X-ray beam from the "standard" source 5. However, since the .050 conductor extending from the No. 5 button of button-contacts 76 of tandem switch 69 is now actively conducting current, a circuit is thus completed through the .050 contacts of relay 119 (now engaging its upper .050 fixed contact) and by conductor .050 to the .050 plunger-contact 56 on insulating disc 50, thence to the metallic disc 18 engaged by the plunger-contact 56 to ground through shaft 40 or brush 59 and from ground G to the center tap of shading field winding 153. Motor M3 thus rotates and replaces the previous .040 insert 55 carried by disc 18 with its .050 insert in the path of the X-ray beam.

Simultaneously, a circuit is also completed to motor M4 upon rotation of switch lever 34 to the "Check" position. This circuit extends from one end of the shading field winding 148 through conductor 147 (terminal $d$ Fig. 10 to $d$ Fig. 9), tandem switch 115 now engaging its "Check" contact, through conductor 136 to tandem switch 105 engaging its .003 contact 109, through conductor 139 to the arm of tandem switch 86 now engaging its No. 4 button of button-contacts 98 and thence through the .007 contacts of relay 120 (now engaging its upper .007 fixed contact) and by the .007 conductor to the corresponding .007 plunger-contact 56 carried by insulating disc 49 which at this time is engaging the metallic disc 17, thence to ground through shaft 43 or brush 58 and from ground G to the center tap of field winding 148. Motor M4 thus rotates to replace the previous .014 insert 55 carried by metallic disc 17 with its .007 insert 55 in the path of the X-ray beam from the "test" source 6. Since the circuit to motor M2 was interrupted by the contacts of relay 120, the "standard" setting of .054 made up by the .040 and .014 inserts carried by metallic discs 22 and 23 thus remains in the path of the X-ray beam from the "standard" source 5. However, discs 17 and 18 now interpose a .050 and a .007 insert in the path of the X-ray beam from "test" source 6 which makes a total of .003 greater which should thus be recorded by deflection of the thickness instrument or null meter to its .003 graduation.

Again as a further "check test" the switch lever 33 may be moved to its .001 position which still leaves the motors M1 and M2 deenergized with the .040 and the .014 inserts 55 carried by the respective discs 22 and 23 aligned with the X-ray beam from the "standard" source 5, since the circuit to such motors remains interrupted by the contacts of relays 119 and 120. Also, the circuit to the motor M3 likewise remains deenergized despite a slight alteration in a part of the previously traced circuit, thus retaining the .050 metallic insert interposed in the path of the X-ray beam from the "test" source 6. For example, instead of the previously traced energizing circuit for the motor M3 being through the switches 106, 88, 74 to the switch 69, upon movement of tandem switch 106 to engage contact 108, a partial circuit will now extend by conductor 134 to arm of tandem switch 89 still engaging its No. 4 button of button contacts 102, through conductor 128 to the arm of tandem switch 75 still engaging its No. 5 button of button contacts 82, and through conductor 125 again to the arm of tandem switch 69 which formed part of the previously traced circuit. Since such circuit is open, due to the engagement of the .050 plunger-contact 56 carried by insulating disc 50 with the insulated block 54 on the metallic disc 18 the motor M3 remains stationary even though contacts of relay 119 are closed at this moment.

Simultaneously, however, engagement of tandem switch 105 with its .001 contact 107 completes a new energizing circuit to the motor M4. This circuit now extends from one end of the winding 148 through conductor 147 (terminal $d$ Fig. 10 to $d$ Fig. 9) to tandem switch arm 115 still engaging its "Check" contact, thence by conductor 136 to tandem switch arm 105 now engaging contact 107, through conductor 138 to arm of tandem switch 85 still engaging the No. 4 button of button contacts 97, and, since such button is connected to the .005 conductor extending through the movable and upper fixed .005 contacts of relay 120 to the .005 plunger-contact 56 carried by insulating disc 49 now engaging the metallic disc 17, the circuit is completed through the shaft 43 or brush 58 to ground and from ground G to the center tap of shading field winding 148. The motor M4 accordingly rotates replacing the .007 metallic disc 55, with the .005 metallic disc 55 carried by metallic disc 17 in alignment with the X-ray beam from "test" source 6. Thus, the .050 insert of disc 18 and the .005 insert of disc 17 will total .055 which is .001 more than the total of the .040 and the .014 inserts of the respective discs 23 and 22, thus causing a .001 deflection of the null meter.

All "checking tests" having shown the entire thickness gauge to be properly functioning, the operator then moves the switch lever 34 to its "Run" position on the panel of the decade selector 28 as previously explained. Such movement again causes the motors M1 and M2 to still remain deenergized because, even though their respective energizing circuits are again partially closed by the contacts of relays 119 and 120, due to energization of their windings upon movement of tandem switch 118 to its "Run" position, such circuits are nevertheless still interrupted by the respective .040 and .014 plunger-contacts 56 being in engagement with the large rectangular insulating block 54 carried by the respective metallic discs 23 and 22. However, in the same manner as previously explained, the movement of the switch lever 34 to the "Run" position automatically causes re-energizaton of the motors M3 and M4, causing them to rotate the discs 17 and 18 and align their respective N. S. or "no sample" opening 55 with the X-ray beam from the "test" source 6, thus conditioning the thickness gauge for measuring the material 19 for a thickness of .054 as it comes from the rolling mill 20.

Although only two specific illustrations have been described in detail for thickness settings of the X-ray thickness gauge of the present invention, it will be obvious that any desired setting of the knobs 29, 30 and 32 will align the proper thickness inserts 55 as well as the flag-gauge as desired, with the X-ray beam from the "standard" source 5, within the range of .005 to .199 inch, and the same is true for the inserts 55 interposed in the X-ray beam from the "test" source 6. Moreover, it follows from what has been shown and described that the tandem switch 84 is the actual selector for the thousandths group of samples from .005 to .014, while tandem switch 85 functions to enable switching to a test sample of .001 more than the set sample. In a similar manner tandem switch 86 functions to enable rotation of the "test" turret disc 17 to a metallic insert 55 having a thickness of .003 greater than the set sample carried by disc 22 at any moment and tandem switch 87 determines when an insert, .010 lower than the value of the hundredth digit on which the switches controlled by knob 30 are resting at a given moment, is automatically interposed in the beam from the "test" source 6. The tandem switches 88 and 89 obviously operate in conjunction with the tandem switches 86 and 87 to allow for stepping-up when the decade selector is set so that the desired setting causes the switches to pass over from a .007 or a .009 metallic insert. The purpose of tandem switch 90 is to synchronize the thousandths selector, or knob 32, with the tenths and hundredths settings by control knobs 20 and 30, when selection at any time passes through 100 mills.

As to tandem switches 69 and 70 controlled by knob 30, they operate in the same manner as above described with respect to the tandem switches 84 and 85, except that they select thicknesses in step of hundredths (.010). Likewise tandem switch 72 operates in conjunction with the step-up feature brought about by tandem switches 88 and 89, as above mentioned, and tandem switch 73 operates to enable a second group of sample inserts 55 to work in conjunction with the 0.1 sample insert as the setting is increased from .104 to .105. Tandem switch 74 on the other hand operates in conjunction with tandem switch 88 to synchronize the step-up feature, while tandem switch 75 also cooperates with tandem switches 88 and 89 in connection with this step-up feature. Relays 119 and 120 operate under control of switch 118 to select the circuits for the motors M1 and M2 at one setting and to select the circuits for motors M3 and M4 at their other setting of the relays 119 and 120, thus eliminating any possible feed back through the grounded center point of the respective motor windings.

From the foregoing it should thus become obvious to those skilled in the art that an X-ray thickness gauge is herein shown and described which is automatically operable in response to initiation by an operator from a remotely disposed control panel. By the provision of a turret having a plurality of metallic inserts of various known thicknesses, which are selectively movable into the path of an X-ray beam from a "standard" source, a "standard" gauge thickness is thus set for the entire gauge. Also by providing a second turret having identical thickness metallic inserts and which are selectively movable into the path of an X-ray beam from a "test" source, a balance test of the thickness gauge can thus be made to show that the gauge is operating accurately owing to a recorder or register, such as a null meter or the like, showing no deflection and remaining fixed at its 0 graduation. As a still further accuracy test the "test" turret is automatically operable in response to initiation by an operator to interpose metallic inserts having known preselected slightly greater thicknesses in the path of the X-ray beam from the "test" source, which selected increase thicknesses are registered by the meter deflecting to a graduation corresponding precisely to the increase thickness of the inserts interposed in the path of the X-ray beam from the "test" source above the thicknesses of the inserts interposed at any moment in the path of the X-ray beam from the "standard" source. Moreover, after making such "check tests" for accuracy the "test" turret is then automatically operable to condition the thickness gauge for measuring material as it comes from the rolling mill of the thickness as selected and set at the moment by the "standard turret."

Although one specific embodiment of the present invention has been shown and described, it is to be understood that other modifications thereof may be made without departing from the spirit and scope of the appended claims.

I claim:

1. An X-ray thickness gauge for measuring material thickness comprising a "standard" source of X-rays and a "test" source of X-rays, light sensitive means responsive to the intensity of the X-ray beam impinging thereon from said "standard" source and said "test" source and operable to cause a registration of the intensity of the X-rays from said sources as a measure of material thicknesses when interposed in said X-ray beams, remotely operable means disposed adjacent the path of the X-ray beam from said "standard" source and provided with a plurality of gauge members of various known thicknesses movable into a position to intercept the X-ray beam from said "standard" source, a second remotely operable means disposed adjacent the path of the X-ray beam from said "test" source and provided with a plurality of gauge members of various known thicknesses similar to said first-mentioned gauge members as well as having a no-gauge index and movable into a position to intercept the X-ray beam from said "test" source, and selector means electrically connected to both said remotely operable means and operable by an operator to preselect the particular gauge members interposed at a given moment in the path of the X-ray beam from said "standard" source and to preselect the particular gauge members at the same moment interposed in the path of the X-ray beam from said "test" source for the purpose of making a balance check that the thickness of the gauge members intercepting both X-ray beams are of equal thickness, and said selector means being also operable to automatically cause said second mentioned remotely operable means to position its no-gauge index in the path of the X-ray beam from said "test" source during operation of said thickness gauge for measuring material of unknown thickness.

2. An X-ray thickness gauge for measuring material thickness comprising a "standard" source of X-rays and a "test" source of X-rays, light sensitive means responsive to the intensity of the X-ray beam impinging thereon from said "standard" source and said "test" source and operable to cause a registration of the intensity of the X-rays from said sources as a measure of material thicknesses when interposed in said X-ray beams, mechanism disposed adjacent the path of the X-ray beam from said "standard" source and provided with a plurality of gauge members of various known thicknesses movable into a position to intercept the X-ray beam from said "standard" source, a second similar mechanism disposed adjacent the path of the X-ray beam from said "test" source and provided with a plurality of gauge members of various known thicknesses similar to said first mentioned gauge members as well as having a no-gauge index and movable into a position to intercept the X-ray beam from said "test" source, a remotely disposed selector panel electrically connected to both said mechanisms and operable by an operator to preselect the particular gauge members interposed at a given moment in the path of the X-ray beam from said "standard" source and to preselect the particular gauge members at the same moment interposed in the path of the X-ray beam from said "test" source for the purpose of making a balance check that the thickness of the gauge members intercepting both X-ray beams are of equal thickness, and said selector panel being also operable to automatically cause said second mentioned mechanism to operate and position its no-gauge index in the path of the X-ray beam from said "test" source during operation of said thickness gauge for measuring material of unknown thickness.

3. An X-ray thickness gauge for measuring material thickness comprising a "standard" source of X-rays and a "test" source of X-rays, light sensitive means responsive to the intensity of the X-ray beam impinging thereon from said "standard" source and said "test" source and operable to cause a registration of the intensity of the X-rays from said sources as a measure of material thicknesses when interposed in said X-ray beams, remotely operable means disposed adjacent the path of the X-ray beam from said "standard" source and provided with a plurality of gauge members of various known thicknesses movable into a position to intercept the X-ray beam from said "standard" source, a second remotely operable means disposed adjacent the path of the X-ray beam from said "test" source and provided with a plurality of gauge members of various known thicknesses similar to said first mentioned gauge members as well as having a no-gauge index and movable into a position to intercept the X-ray beam from said "test" source, selector means operable by an operator to preselect the particular gauge members interposed at a given moment in the path of the X-ray beam from said "standard" source and to preselect the particular gauge members at the same moment interposed in the path of the X-ray beam from said "test" source, control means operable by said selector means and electrically connected to both said remotely operable means to cause automatic operation of the latter with attendant movement of the gauge members of said first-mentioned remotely operable means and having the desired thickness as selected by said selector means into position to intercept the X-ray beam from said "standard" source and to automatically cause movement of the no-gauge index of said second mentioned remotely operable means into interposed position with the X-ray beam from said "test" source, to condition said thickness gauge for measuring the thickness of unknown material interposed in the X-ray beam from said "test" source by comparison with the thickness of the gauge members at the moment intercepting the X-ray beam from said "standard" source; and said selector means being operable to cause said control means to automatically operate said second mentioned remotely operable means and position the gauge members having the same total thickness as the gauge members at the same moment intercepting the X-ray beam from said "standard" source, in the path of the X-ray beam from said "test" source for making a balance check of said thickness gauge by a resultant null registration of the intensities of the X-ray beam from both said sources as a measure of the equal thicknesses of said gauge members.

4. An X-ray thickness gauge for measuring material thickness comprising a "standard" source of X-rays and a "test" source of X-rays, light sensitive means responsive to the intensity of the X-ray beam impinging thereon from said "standard" source and said "test" source and operable to cause a registration of the intensity of the X-rays from said sources as a measure of material thicknesses when interposed in said X-ray beams, mechanism disposed adjacent the path of the X-ray beam from said "standard" source and provided with a plurality of gauge members of various known thicknesses movable into a position to intercept the X-ray beam from said "standard" source, a second similar mechanism disposed adjacent the path of the X-ray beam from said "test" source and provided with a plurality of gauge members of various known thicknesses similar to said first-mentioned gauge members as well as having a no-gauge index and movable into a position to intercept the X-ray beam from said "test" source, a remotely disposed selector panel operable by an operator to preselect the particular gauge members interposed at a given moment in the path of the X-ray beam from said "standard" source and to preselect the particular gauge members at the same moment interposed in the path of the X-ray beam from said "test" source, control means operable by said selector means and electrically connected to both said mechanisms to cause automatic operation of the latter with attendant movement of said gauge members of said first mentioned remotely operable means and having the desired thickness as selected by said selector means into position to intercept the X-ray beam from said "standard" source and to automatically cause movement of the no-gauge index of said second mentioned remotely operable means into interposed position with the X-ray beam from said "test" source, to condition said thickness gauge for measuring the thickness of unknown material interposed in the X-ray beam from said "test" source by comparison with the thickness of the gauge members at the moment intercepting the X-ray beam from said "standard" source; and said selector means being operable to cause said control means to automatically operate said second mentioned remotely operable means and position the gauge members having the same total thickness as the gauge members at the same moment intercepting the X-ray beam from said "standard" source, in the path of the X-ray beam from said "test" source for making a balance check of said thickness gauge by a resultant null registration of the intensities of the X-ray beam from both said sources as a measure of the equal thicknesses of said gauge members.

5. An X-ray thickness gauge for measuring material thickness comprising a "standard" source of X-rays and a "test" source of X-rays, light sensitive means responsive to the intensity of the X-ray beam impinging thereon from said "standard" source and said "test" source and operable to cause a registration of the intensity of the X-rays from said sources as a measure of material thicknesses when interposed in said X-ray beams, remotely operable means disposed adjacent the path of the X-ray beam from said "standard" source and provided with a plurality of gauge members of various known thicknesses movable into a position to intercept the X-ray beam from said "standard" source, a second remotely operable means disposed adjacent the path of the X-ray beam from said "test" source and provided with a plurality of gauge members of various known thicknesses similar to said first-mentioned gauge members as well as having a no-gauge index and movable into a position to intercept the X-ray beam from said "test" source, selector means operable by an operator to preselect the particular gauge members interposed at a given moment in the path of the X-ray beam from said "standard" source and to preselect the particular gauge members at the same moment interposed in the path of the X-ray beam from said "test" source, control means operable by said selector means to cause automatic operation of both said remotely operable means and attendant movement of the gauge members of said first-mentioned remotely operable means and having the desired thickness as selected by said selector means into position to intercept the X-ray beam from said "standard" source and to automatically cause movement of the no-gauge index of said second mentioned remotely operable means into interposed position with the X-ray beam from said "test" source, to condition said thickness gauge for measuring the thickness of material passing through the X-ray beam form said "test" source by comparison with the thickness of the gauge members at the moment intercepting the X-ray beam from said "standard" source; and said selector means being operable to cause said control means to automatically operate said second mentioned remotely operable means and position the gauge members having the same total thickness as the gauge members at the same moment intercepting the X-ray beam from said "standard" source, in the path of the X-ray beam from said "test" source for making a balance check of said thickness gauge by a resultant null registration of the intensities of the X-ray beam from both said sources as a measure of the same thicknesses of said gauge members, and means operable at the will of an operator carried by said selector means and connected to said control means for causing the latter to automatically operate said second mentioned remotely operable means and increase by a preselected amount the thickness of the gauge members interposed in the path of the X-ray beam from said "test" source with an attendant registration of such increased thickness as a further check on the accuracy of operation of said thickness gauge.

6. An X-ray thickness gauge for measuring material thickness comprising a "standard" source of X-rays and a "test" source of X-rays, light sensitive means responsive to the intensity of the X-ray beam impinging thereon from said "standard" source and said "test" source and operable to cause a registration of the intensity of the X-rays from said sources as a measure of material thicknesses when interposed in said X-ray beams, mechanism disposed adjacent the path of the X-ray beam from said "standard" source comprising independently rotatable discs provided with a plurality of gauge members of various known thicknesses ranging in hundredths and thousandths of an inch and movable into a position to intercept the X-ray beam from said "standard" source, a second substantially identical mechanism disposed adjacent the path of the X-ray beam from said "test" source, also comprising independently rotatable discs provided with identical gauge members as said first-mentioned discs as well as having a no-gauge index and movable into a position to intercept the X-ray beam from said "test" source, a remotely located panel provided with selector knobs operable by an operator to preselect the particular gauge members interposed at a given moment in the path of the X-ray beam from said "standard" source and to preselect the particular gauge members at the same moment interposed in the path of the X-ray beam from said "test" source, control means operable by said selector knobs and electrically connected to both said mechanisms to cause automatic operation of the latter with attendant automatic rotation of the respective discs to position the gauge members of said first-mentioned mechanism having the desired thickness as preselected by said selector knobs in the path of the X-ray beam from said "standard" source and to automatically cause rotation of the no-gauge index of said second mentioned mechanism into interposed position with the X-ray beam from said "test" source, to condition said thickness gauge for measuring the thickness of unknown material interposed in the X-ray beam from said "test" source by comparison with the thickness of the gauge members at the moment intercepting the X-ray beam from said "standard" source; and certain of said selector knobs being operable to also cause the said control means to automatically operate said second mentioned mechanism with attendant rotation of its discs to position the gauge members having the same total thickness as the gauge members at the same moment intercepting the X-ray beam from said "standard" source, in the path of the X-ray beam from said "test" source for making a balance check of said thickness gauge by a resultant null registration of the intensities of the X-ray beam from both said sources as a measure of the equal thicknesses of said gauge members.

7. An X-ray thickness gauge for measuring material thickness comprising a "standard" source of X-rays and a "test" source of X-rays, light sensitive means responsive to the intensity of the X-ray beam impinging thereon from said "standard" source and said "test" source and operable to cause a registration of the intensity of the X-rays from said sources as a measure of material thicknesses when interposed in said X-ray beams, mechanism disposed adjacent the path of the X-ray beam from said "standard" source comprising independently rotatable discs provided with a plurality of gauge members of various known thicknesses ranging in hundredths and thousandths of an inch and movable into a position to intercept the X-ray beam from said "standard" source, a second substantially identical mechanism disposed adjacent the path of the X-ray beam from said "test" source also comprising independently rotatable discs provided with identical gauge members as said first-mentioned discs as well as having a no-gauge index and movable into a position to intercept the X-ray beam from said "test" source, a remotely disposed panel provided with selector knobs operable by an operator to preselect the particular gauge members interposed at a given moment in the path of the X-ray beam from said "standard" source and to preselect the particular gauge members at the same moment interposed in the path of the X-ray beam from said "test" source, control means operable by said selector knobs and electrically connected to both said mechanisms to cause automatic operation of the latter with attendant automatic rotation of the respective discs to position the gauge members of said first-mentioned mechanism having the desired thickness as preselected by said selector knobs in the path of the X-ray beam from said "standard" source and to automatically cause rotation of the no-gauge index of said second-mentioned mechanism into interposed position with the X-ray beam from said "test" source, to condition said thickness gauge for measuring the thickness of unknown material interposed in the X-ray beam from said "test" source by comparison with the thickness of the gauge members at the moment intercepting the X-ray beam from said "standard" source; and certain of said selector knobs being operable to also cause said control means to automatically operate said second mentioned mechanism with attendant rotation of its discs to position the gauge members having the same total thickness as the gauge members at the same moment intercepting the X-ray beam from said "standard" source, in the path of the X-ray beam from said "test" source for making a balance check of said thickness gauge by a resultant null registration of the intensities of the X-ray beam from both said sources as a measure of the equal thicknesses of said gauge members, and an additional selector knob on said panel operable at the will of an operator and connected to said control means for causing the latter to automatically operate said second mentioned mechanism with rotation of its discs to increase by a preselected definite amount the thickness of the gauge members interposed in the path of the X-ray beam from said "test" source with an attendant registration of such definite increased thickness as a further check on the accuracy of operation of said thickness gauge.

8. An X-ray thickness gauge for measuring material thickness comprising a "standard" source of X-rays and a "test" source of X-rays, light sensitive means responsive to the intensity of the X-ray beam impinging thereon from said "standard" source and said "test" source and operable to cause a registration of the intensity of the X-rays from said sources as a measure of material thicknesses when interposed in said X-ray beams, mechanism disposed adjacent the path of the X-ray beam from said "standard" source comprising independently rotatable discs provided with a plurality of gauge members of various known thicknesses ranging in hundredths of an inch for one of said discs and ranging in thousandths of an inch for the other of said discs, and one gauge member of each disc being movable into a position to intercept the X-ray beam from said "standard" source; a second substantially identical mechanism disposed adjacent the path of the X-ray beam from said "test" source also comprising independently rotatable discs provided with identical gauge members as said first-mentioned discs as well as having a no-gauge index and one gauge member or the no-gauge index of each disc being movable into a position to intercept the X-ray beam from said "test" source, a remotely disposed panel provided with a plurality of selector knobs operable by an operator to preselect the particular gauge members interposed at a given moment in the path of the X-ray beam from said "standard" source and to preselect the particular gauge members at the same moment interposed in the path of the X-ray beam from said "test" source, control means operable by said selector knobs and electrically connected to both said mechanisms to cause automatic operation of the latter with attendant automatic rotation of the respective discs to position the hundredths and thousandths gauge members of said first-mentioned mechanism having the desired thickness as selected by said selector knobs in the path of the X-ray beam from said "standard" source and to automatically cause rotation of the no-gauge index of the discs of said second-mentioned mechanism into interposed position with the X-ray beam from said "test" source, to condition said thickness gauge for measuring the thickness of unknown material interposed in the X-ray beam from said "test" source by comparison with the thickness of the gauge members at the moment intercepting the X-ray beam from said "standard" source; certain of said selector knobs being operable to also cause said control means to automatically operate said second mentioned mechanism with attendant rotation of its discs to position the gauge members having the same total thickness as the gauge members at the same moment intercepting the X-ray beam from said "standard" source, in the path of the X-ray beam from said "test" source for making a balance check of said thickness gauge by a resultant null registration of the intensities of the X-ray beam from both said sources as a measure of the equal thicknesses of said gauge members, an additional selector knob on said panel operable at the will of an operator and connected to said control means for causing the latter to automatically operate said second mentioned mechanism with rotation of its discs to increase by a preselected definite amount the thickness of the gauge members interposed in the path of the X-ray beam from said "test" source with an attendant registration of such definite increased thickness as a further check on the accuracy of operation of said thickness gauge, and a still further of said selector knobs being operable by an operator and connected to said control means and operable to cause the automatic operation of both said mechanisms to increase in steps of one-tenth of an inch the thickness of the gauge members interposed in the path of the X-ray beam from said "standard" and "test" sources.

9. An X-ray thickness gauge for measuring material thickness comprising a "standard" source of X-rays and a "test" source of X-rays, light sensitive means responsive to the intensity of the X-ray beam impinging thereon from said "standard" source and said "test" source and operable to cause a registration of the intensity of the X-rays from said sources as a measure of material thickness when interposed in said X-ray beams, mechanism disposed adjacent the path of the X-ray beam from said "standard" source comprising independently rotatable discs provided with a plurality of gauge members of various known thicknesses ranging in hundredths of an inch for one of said discs and ranging in thousandths of an inch for the other of said discs, and one gauge member of each disc being movable into a position to intercept the X-ray beam from said "standard" source; a second substantially identical mechanism disposed adjacent the path of the X-ray beam from said "test" source also comprising independently rotatable discs provided with identical gauge members as said first-mentioned discs as well as having a no-gauge index, and one gauge member or the no-gauge index of each disc being movable into a position to intercept the X-ray beam from said "test" source; a remotely disposed panel provided with a plurality of selector knobs operable by an operator to various preselected positions, a gang of tandem switches operable by the positioning of one of said selector knobs to preselect the particular hundredths gauge member interposed at a given moment in the path of the X-ray beam from said "standard" source and to preselect the particular hundredths gauge member at the same moment interposed in the path of the X-ray beam from said "test" source, a second gang of tandem switches operable by the positioning of a second one of said selector knobs to preselect the particular thousandths gauge members interposed simultaneously with the hundredths gauge members in the path of the X-ray beam from the respective "standard" and "test" sources, electrical circuits connected to both said mechanisms and including certain of said tandem switches to cause operation of both said mechanisms with attendant automatic rotation of their respective discs to position the gauge members of said first-mentioned mechanism having the desired thickness as preselected by the positioning of said selector knobs, in the path of the X-ray beam from said "standard" source, and to automatically cause rotation of the no-gauge index of the discs of said second mentioned mechanism into interposed position with the X-ray beam from said "test" source, to condition said thickness gauge for measuring the thickness of unknown material interposed in the X-ray beam from said "test" source by comparison with the thickness of the gauge members at the moment intercepting the X-ray beam from said "standard" source; another gang of tandem switches operable by the positioning of a further one of said selector knobs for closing certain of said electrical circuits to cause automatic operation of said second-mentioned mechanism with attendant rotation of its discs to position the hundredths and thousandths gauge members having the same total thickness as the gauge members at the same moment intercepting the X-ray beam from said "standard" source, in the path of the X-ray beam from said "test" source for making a balance check of said thickness gauge by a resultant null registration of the intensities of the X-ray beam from both said sources as a measure of an equal thickness of said gauge members; and a still further gang of tandem switches operable by the positioning of a still further one of said selector knobs and included in certain other of said electrical circuits and operable to cause automatic rotation of the discs of said second-mentioned mechanism to increase by a preselected definite amount the thickness of the gauge members interposed in the path of the X-ray beam from said "test" source, with an attendant registration of such definite increased thickness as a further check on the accuracy of operation of said thickness gauge.

10. An X-ray thickness gauge for measuring material thickness comprising a "standard" source of X-rays and a "test" source of X-rays, light sensitive means responsive to the intensity of the X-ray beam impinging thereon from said "standard" source and said "test" source and operable to cause a registration of the intensity of the X-rays from said sources as a measure of material thickness when interposed in said X-ray beams, mechanism disposed adjacent the path of the X-ray beam from said "standard" source comprising independently rotatable discs provided with a plurality of gauge members of various known thicknesses ranging in hundredths of an inch for one of said discs and ranging in thousandths of an inch for the other of said discs, and one gauge member of each disc being movable into a position to intercept the X-ray beam from said "standard" source; a second substantially identical mechanism disposed adjacent the path of the X-ray beam from said "test" source also comprising independently rotatable discs provided with identical gauge members as said first-mentioned discs as well as having no-gauge index, and one gauge member or the no-gauge index of each disc being movable into a position to intercept the X-ray beam from said "test" source; a remotely disposed panel provided with a plurality of selector knobs operable by an operator to various preselected positions, a gang of tandem switches operable by the positioning of one of said selector knobs to preselect the particular hundredths gauge member interposed at a given moment in the path of the X-ray beam from said "standard" source and to preselect the particular hundredths gauge member at the same moment interposed in the path of the X-ray beam from said "test" source, a second gang of tandem switches operable by the positioning of a second one of said selector knobs to preselect the particular thousandths gauge member interposed simultaneously with the hundredths gauge members in the path of the X-ray beam from the respective "standard" and "test" sources, electrical circuit connected to both said mechanisms and including certain of said tandem switches to cause operation of both said mechanisms with attendant automatic rotation of the respective discs to position the gauge members of said first-mentioned mechanism having the desired thickness as preselected by the positioning of said selector knobs, in the path of the X-ray beam from said "standard" source, and to automatically cause rotation of the no-gauge index of the discs of said second mentioned mechanism into interposed position with the X-ray beam from said "test" source, to condition said thickness gauge for measuring the thickness of unknown material interposed in the X-ray beam from said "test" source by comparison with the thickness of the gauge members at the moment intercepting the X-ray beam from said "standard" source; another gang of tandem switches operable by the positioning of a further one of said selector knobs for closing certain of said electrical circuits to cause automatic operation of said second-mentioned mechanism with attendant rotation of its discs to position the hundredths and thousandths gauge members having the same total thickness as the gauge members at the same moment intercepting the X-ray beam from said "standard" source, in the path of the X-ray beam from said "test" source for making a balance check of said thickness gauge by a resultant null registration of the intensities of the X-ray beam from both said sources as a measure of an equal thickness of said gauge members, a further gang of tandem switches operable by the positioning of a still further one of said selector knobs and included in certain other of said electrical circuits and automatically operable to cause rotation of the discs of said second mentioned mechanism to increase by a preselected definite amount the thickness of the gauge members interposed in the path of the X-ray beam from said "test" source with an attendant registration of such definite increased thickness as a further check on the accuracy of operation of said thickness gauge, and a still further gang of tandem switches operable by the positioning of another one of said selector knobs and included in still additional of said electrical circuits and operable to automatically increase in steps of one-tenth of an inch the thickness of the gauge members interposed by both said mechanisms in the path of the X-ray beam from said "standard" and "test" sources.

WALTER N. LUNDAHL.

REFERENCES CITED

The following references are of record in the file of this patent:

Clapp et al.: Electrical Engineering, May 1948, pp. 441–444.